(12) United States Patent
Hirano et al.

(10) Patent No.: US 7,867,546 B2
(45) Date of Patent: Jan. 11, 2011

(54) LOW-CALORIE FOOD AND BEVERAGES

(75) Inventors: Masahiro Hirano, Tokyo (JP); Akifumi Tsuruta, Tokyo (JP)

(73) Assignee: The Coca-Cola Company, Atlanta, GA (US)

( * ) Notice: Subject to any disclaimer, the term of this patent is extended or adjusted under 35 U.S.C. 154(b) by 518 days.

(21) Appl. No.: 11/525,829

(22) Filed: Sep. 25, 2006

(65) Prior Publication Data

US 2008/0075831 A1  Mar. 27, 2008

(30) Foreign Application Priority Data

Sep. 22, 2006  (JP) .............................. 2006-257887

(51) Int. Cl.
*A23G 3/00* (2006.01)
*A23L 2/00* (2006.01)

(52) U.S. Cl. ...................... 426/658; 426/580; 426/590

(58) Field of Classification Search ................ 426/580, 426/583, 584, 587, 588, 590, 593, 597, 598, 426/599, 658
See application file for complete search history.

(56) References Cited

U.S. PATENT DOCUMENTS

| 5,527,556 | A | 6/1996 | Frippiat et al. |
| 5,721,004 | A | 2/1998 | James |

FOREIGN PATENT DOCUMENTS

| EP | 0 821 885 A1 | 2/1998 |
| EP | 1 795 204 A1 | 6/2007 |
| JP | 02-249474 | 10/1990 |
| WO | WO 2006/033162 A1 | 3/2006 |
| WO | WO 2006/035979 A1 | 4/2006 |

OTHER PUBLICATIONS

International Search Report and Written Opinion, issued Aug. 29, 2008, corresponding to PCT/US2007/078701.

*Primary Examiner*—Leslie Wong
(74) *Attorney, Agent, or Firm*—Finnegan, Henderson, Farabow, Garrett & Dunner, LLP

(57) ABSTRACT

A non-fat or low-fat food and beverage product having low calories is provided. The product offers a flavor, body and fat's texture. The food and beverage product includes a fat-like texture substance containing inulin as a main ingredient and polyglutamic acid.

12 Claims, No Drawings

LOW-CALORIE FOOD AND BEVERAGES

CROSS REFERENCE TO RELATED APPLICATION

This application is based upon and claims the benefit of priority from Japanese Patent Application No. 2006-257887, filed Sep. 22, 2006, the entire content of which is incorporated herein by reference.

FIELD OF THE INVENTION

This invention relates to food and beverages having low calories. More particularly, the invention is directed to non-fat or low fat food and beverages having a flavor, body, and the texture of fat.

BACKGROUND OF THE INVENTION

Recently, non-fat or low-fat food and beverages with low calories are becoming popular, and low-calorie food and beverages that maintain a flavor, body and the texture of fat are desired. Conventional non-fat or low-fat food and beverage products have lower calories by reducing their fat content; however, they lose fat's texture, body, and smooth taste, and their flavors decrease due to the reduced milk fat.

In an effort to solve this problem, flavoring additives were added; however, it still could not achieve desired body. In addition, for example, a substance for beverages that contains polyamino acid from natto (fermented soybean) bacillus as the main ingredient is suggested (see Japanese Laid-Open Patent H2-249474), but low-calorie food and beverages with fat's texture were not realized.

Therefore, non-fat or low-fat food and beverages having low calories and that offer a flavor, body and fat's texture are desired.

SUMMARY OF THE INVENTION

It is accordingly an object of the invention to provide non-fat or low-fat food and beverages having low calories and that offer a flavor, body and fat's texture. In accordance with the invention, a food and beverage product having a fat-like texture substance containing inulin as a main ingredient and polyglutamic acid.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE EMBODIMENTS

Reference will now be made in detail to the present exemplary embodiments of the invention. The inventors of this patent application used inulin in order to produce non-fat or low-fat coffee drink with a flavor, body, and fat's texture. The inventors realized that in order to achieve desired fat texture, it was necessary to add an increased amount of inulin. However, while the added amount of inulin provided fat texture, it became powder-like and resulted in a bad aftertaste. The inventor realized that by adding a fat-like texture substance containing inulin as a main ingredient and a small amount of polyglutamic acid, the powderiness issue was resolved and improved flavor, body, and fat's texture were obtained.

According to this invention, a non-fat or low-fat food and beverage product having low calories and that offers a flavor, body and fat's texture is achieved.

One exemplary embodiment according to the invention is explained. It is intended that the embodiment should be considered as exemplary only.

A low-calorie food and beverage product of this invention has a fat-like texture substance containing inulin as a main ingredient and polyglutamic acid. By having these ingredients, it is possible to obtain a low-calorie food and beverage product that has a flavor, body, and fat's texture.

Throughout the specification, the term "food and beverage product" refers to a food product, a beverage product, or a combination of both. The beverage product may include coffee drink, milk tea, tea drink, juice, vegetable juice, carbonated drink, milk-related drink, lactic acid drink, soy milk, energy drink, other soft drinks, jelly-type drink, and any other beverage suitable for this invention. The food product may include pudding, yogurt, jelly, snacks, and any other food the skilled artisan would consider suitable.

Also, the term fat-like texture substance refers to a substance that adds or improves fat's texture of food and beverage products due to interactions between inulin and polyglutamic acid when the substance is added to the food and beverage products. The fat's texture includes, for example, the texture of milk fat. Inulin and polyglutamic acid do not have to be mixed beforehand, and each of them can be added at appropriate times during a manufacturing process of the food and beverage products.

Moreover, the term "inulin as a main ingredient" means that in a food and beverage product containing inulin and polyglutamic acid, more inulin is contained in the product that polyglutamic acid in weight. Preferably, inulin is contained in the product about 100 to 250 times more in weight than polyglutamic acid. By containing inulin and polyglutamic acid at these ratios, improved results may be obtained.

In case of a beverage product, it is preferable to contain 3-20 gram/liter (g/L) of inulin and 0.02-0.05 g/L of polyglutamic acid.

Inulin is an oligosaccharide produced by chicory, an artichoke, an onion, a leek, garlic, a burdock, a banana, etc. Inulin is a water-soluble dietary fiber, and it forms fat-formed cream when dissolved in water and has fat's texture. Inulin can be obtained, for example, by adding glycosyltransferase to a sterilized sugar solution that is made of a refined sugar product as raw materials.

Polyglutamic acid is known as a chief ingredient of a stickiness substance in natto (fermented soybeans). Polyglutamic acid has many negative ions and promotes an absorption of minerals, such as calcium. Moreover, polyglutamic acid has water-retention (humidity retention) characteristics and hydrophilicity. As polyglutamic acid, it is preferable to use a polymer of amino acid including D-glutamic acid and L-glutamic acid.

In addition, the low-calorie food and beverage product may include powdered skim milk. In certain beverages, such as coffee drink and beverages that usually contain a milk ingredient, the fat-like texture substance with powdered skim milk may provide a flavor and body while achieving reduced milk fat.

EXAMPLES

Examples are described below. The scope of the invention should not be limited by the examples. Other examples will be apparent to those skilled in the art from consideration of the specification and practice of the invention disclosed herein.

[Manufacture of Samples C-5~C-7]

30 grams of R & G coffee (powder coffee) was extracted with 95° C. of hot water and prepared to contain 7.5 grams of coffee solidity. Next, 35 grams of sugar, 0.6 grams of emulsifier, and 20.5 grams of powdered skim milk were subsequently added to the coffee and dissolved. Then inulin (FujiFF made by Fuji Nihon Sugar Refining Company) and γ-PGA (γ-polyglutamic acid) (a product made by Ajinomoto) were mixed at concentrations indicated at Table 2 and dissolved. Finally, 0.85 grams of sodium bicarbonate and 1 gram of flavoring agent were mixed, and water was added to the mixture, and 1 liter of coffee drink was prepared. The coffee drink was packaged in cans and sterilized in a retort, and each sample (C-5-C-7, comparison example (Control) 1, 2) was made. Compositions of samples are shown in Table 1.

TABLE 1

| Composition of Each Sample (g/L) | |
| --- | --- |
| R&G Coffee | 30 |
| (Coffee Solidity) | (7.5) |
| Powdered Skim Milk | 20.5 |
| Sugar | 35 |
| Sodium Bicarbonate | 0.85 |
| Emulsifier | 0.6 |
| Flavoring Agent | 1.0 |
| Inulin | See Table 2 |
| γ-PGA | See Table 2 |
| Water | Remaining Amount |
| Coffee Drink | 1 L |

TABLE 2

| | Inulin (g/L) | γ-PGA (g/L) |
| --- | --- | --- |
| Control 1 | 5.00 | 0.00 |
| Control 2 | 7.00 | 0.00 |
| C-5 | 5.00 | 0.03 |
| C-6 | 5.00 | 0.04 |
| C-7 | 5.00 | 0.05 |

[Evaluation]

Five coffee samples made by the above method were evaluated. A tasting test by six panel members who had experience in drink development was performed. The panel members evaluated the samples for their fat texture and powderiness (roughness). Each sample was graded for its fat texture on a scale of 0-10 points. Comparison Example 1 (Control 1) was graded as 5, and a higher number indicated more fat texture. Each sample was also graded for its powderiness on a scale of 0-10 points. Comparison Example 1 (Control 1) was graded as 5, and a higher number indicated more powderiness. Table 3 shows the average score of the six panel members.

TABLE 3

| | Fat Texture | Powderiness |
| --- | --- | --- |
| Control 1 | 5 | 5 |
| Control 2 | 6.3 | 6-7 |
| C-5 | 5.5 | 5.5 |
| C-6 | 6.2 | 5.5 |
| C-7 | 6.3 | 5.7 |

As indicated by Table 3, enough fat texture was not achieved with adding only inulin, and with a high concentration of inulin, as in Control 2, the fat texture was improved, but the powderiness and aftertaste were not satisfactory. In contrast, C-5~C-7 provided improved fat texture and reduced powderiness. Also, these samples provided excellent body and flavor.

Moreover, another comparison was made with a product containing the same amount of inulin and poly glutaminic acid, and it was found that the product failed to provide sufficient body and flavor.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A food and beverage product, comprising a fat-like texture substance containing inulin as a main ingredient and polyglutamic acid, wherein the fat-like texture substance contains the inulin in an amount ranging from about 100 to about 250 times more in weight than the polyglutamic acid.

2. The product of claim 1, further comprising powdered skim milk.

3. The product of claim 1, wherein the fat-like texture substance has the texture of milk fat.

4. The product of claim 1, wherein the product is low-fat.

5. The product of claim 4, wherein the product is non-fat.

6. The product of claim 1, wherein the product is a beverage product.

7. The product of claim 6, wherein the inulin is present in an amount ranging from about 3 grams per liter to about 20 grams per liter.

8. The product of claim 6, wherein the polyglutamic acid is present in an amount ranging from about 0.02 grams per liter to about 0.05 grams per liter.

9. The product of claim 6, wherein the beverage product is chosen from at least one of a coffee drink, milk tea, tea drink, juice, vegetable juice, carbonated drink, milk-related drink, lactic acid drink, soy milk, energy drink, other soft drinks, jelly-type drinks, or a combination thereof.

10. The product of claim 9, wherein the beverage product is a coffee drink.

11. The product of claim 1, wherein the product is a food product.

12. The product of claim 8, wherein the food product is chosen from at least one of pudding, yogurt, jelly, or a combination thereof.

* * * * *